United States Patent
Kumar et al.

(10) Patent No.: US 8,642,123 B1
(45) Date of Patent: Feb. 4, 2014

(54) INTEGRATION OF ZNO NANOWIRES WITH NANOCRYSTALLINE DIAMOND FIBERS

(75) Inventors: Ashok Kumar, Tampa, FL (US); Manoj Kumar Singh, Aveiro (PT); Sathyaharish Jeedigunta, Tampa, FL (US)

(73) Assignee: University of South Florida, Tampa, FL (US)

( * ) Notice: Subject to any disclaimer, the term of this patent is extended or adjusted under 35 U.S.C. 154(b) by 70 days.

(21) Appl. No.: 12/780,566

(22) Filed: May 14, 2010
(Under 37 CFR 1.47)

Related U.S. Application Data

(63) Continuation-in-part of application No. 11/689,690, filed on Mar. 22, 2007, now abandoned.

(60) Provisional application No. 60/767,373, filed on Mar. 22, 2006.

(51) Int. Cl.
*C23C 16/00* (2006.01)
*H05K 3/02* (2006.01)

(52) U.S. Cl.
USPC .......................... 427/227; 427/226; 427/576

(58) Field of Classification Search
None
See application file for complete search history.

(56) References Cited

U.S. PATENT DOCUMENTS

| | | | |
|---|---|---|---|
| 5,472,370 A * | 12/1995 | Malshe et al. | 451/41 |
| 6,422,077 B1 | 7/2002 | Krauss et al. | |
| 6,996,147 B2 | 2/2006 | Majumdar et al. | |
| 7,445,671 B2 | 11/2008 | Sunkara et al. | |
| 2001/0047980 A1 | 12/2001 | McNallan et al. | |
| 2002/0114756 A1 | 8/2002 | Gruen et al. | |
| 2003/0126742 A1 * | 7/2003 | Ting et al. | 29/874 |
| 2003/0160542 A1 | 8/2003 | Bi et al. | |
| 2004/0115123 A1 * | 6/2004 | Zhou et al. | 423/598 |
| 2004/0137214 A1 * | 7/2004 | Chen et al. | 428/323 |
| 2005/0133254 A1 * | 6/2005 | Tsakalakos | 174/261 |
| 2006/0071207 A1 * | 4/2006 | Conley et al. | 257/43 |
| 2006/0222850 A1 * | 10/2006 | Xiao et al. | 428/408 |

OTHER PUBLICATIONS

Chiou, Diamond and Related Materials, V12 (2003), p. 1841.*
Hyun, K., Yi, K. Y., Ouk, J. S., Chan, K. D., and Koun, C. H. 2006. "Effect of Lattice Mismatch on the Formation of ZnO-Based Nanorods." Proc. Int. Symp. Dry. Process. vol. 6. pp. 307-308.
Final Office Action for parent U.S. Appl. No. 11/689,690 dated Jul. 13, 2009.
Non-Final Office Action for parent U.S. Appl. No. 11/689,690 dated Nov. 17, 2009.
Manna, L., Scher, E. C., Li, L., and Alivisatos, A. P. 2002. "Epitaxial Growth and Photochemical Annealing of Graded CdS/ZnS Shells on Colloidal CdSe Nanorods." J. Am. Chem. Soc. vol. 124. pp. 7136-7145.
He, J. H., Ho, C. H., Wang, C. W., Ding, Y., Chen, L. J., and Wang, Z. L. 2009. "Growth of Crossed ZnO Nanorod Networks Induced by Polar Substrate Surface." Crystal Growth & Design. vol. 9. No. 1. pp. 17-19.

(Continued)

*Primary Examiner* — Joseph Miller, Jr.
(74) *Attorney, Agent, or Firm* — Robert J. Varkonyi; Smith & Hopen, P.A.

(57) ABSTRACT

Provided herein is a method for the synthesis and the integration of ZnO nanowires and nanocrystalline diamond as a novel hybrid material useful in next generation MEMS/NEMS devices. As diamond can provide a highly stable surface for applications in the harsh environments, realization of such hybrid structures may prove to be very fruitful. The ZnO nanowires on NCD were synthesized by thermal evaporation technique.

17 Claims, 11 Drawing Sheets

(56) References Cited

OTHER PUBLICATIONS

Liu, X., Wu, X., Cao, H., and Chang, R. P. H. 2004. "Growth Mechanism and Properties of ZnO Nanorods Synthesized by Plasma-Enhanced Chemical Vapor Deposition." Journal of Applied Physics. vol. 95. No. 6. pp. 3141-3147.

Non-Final Office Action for parent U.S. Appl. No. 11/689,690 dated Mar. 6, 2009.

Jeedigunta, S., Kumar, A., and Singh, M. K. "Integration of ZnO Nanowires with Nanocrystalline Diamond: A New Class of Hybrid Material." Advanced Materials. pp. 1-7.

Jam Palmer, D. W., 2007. "Properties of Diamond, Silicon and Germanium." www.semiconductors.co.uk, 2007-A. pp. 1-5.

T. Yao and K. Hong, Oxide and Nitride Semiconductors; Processing, Properties, and Applications. Springer (Hardcover) 2009. ISBN: 978-3-540-88846-8. http://www.springer.com/978-3-540-88846-8.

S. Mitura, K. Mitura, P. Niedzielski, P. Louda, and V. Danilenko, Nanocrystalline diamond, its synthesis, properties and applications. Journal of Achievements in Materials and Manufacturing Engineering, vol. 16, Issue 1-2, May-Jun. 2006, pp. 9-16.

Jingchun Zhang, Jerry W. Zimmer, Roger T. Howe, Roya Maboudian, Characterization of boron-doped micro- and nanocrystalline diamond films deposited by wafer-scale hot filament chemical vapor deposition for MEMS applications. Publication: Diamond and Related Materials, vol. 17, Issue 1, pp. 1-15, Jan. 2008.

Sathyaharish Jeedigunta, Growth and characterization of nanocrystalline diamond films for microelectronics and microelectromechanical systems. Graduate School Thesis and Dissertations; Scholar Commons, University of South Florida, Jun. 1, 2008.

Power Point Presentation on Semiconductor Fundamentals, Spring 2007. EE 130 Lecture 1, Slides 1-12.

\* cited by examiner

INTEGRATION OF ZNO NANOWIRES WITH NANOCRYSTALLINE DIAMOND FIBERS

CROSS REFERENCE TO RELATED APPLICATIONS

This application is a continuation-in-part of U.S. application Ser. No. 11/689,690, entitled, "Integration of ZnO Nanowires with Nanocrystalline Diamond Fibers" filed Mar. 22, 2007; which claims priority to U.S. Provisional Patent Application 60/767,373, entitled, "Integration of ZnO Nanowires with Nanocrystalline Diamond Fibers", filed Mar. 22, 2006; the contents of which are fully incorporated herein by reference.

STATEMENT OF GOVERNMENT INTEREST

This invention was made with Government support under Grant No. ECS-0404137 awarded by the National Science Foundation. The federal government has certain rights in this invention.

BACKGROUND OF THE INVENTION

A nanowire is a wire having at least one dimension, typically a lateral size, constrained to tens of nanometers or less and an unconstrained longitudinal size. Examples of different types of nanowires include metallic (Ni, Pt, Au), semiconducting and insulating; representative materials include, but are not limited to, InP, Si, GaN, $SiO_2$, $TiO_2$, etc.

Typical nanowires exhibit aspect ratios of 1000 or more. As such they are often referred to as 1-dimensional materials. Nanowires have many interesting properties that are not seen in bulk or 3-D materials since electrons in nanowires are quantum confined laterally; and thus occupy energy levels that are different from the traditional continuum of energy levels or bands found in bulk materials. This quantum confinement is exhibited by certain nanowires, such as carbon nanotubes, which results in discrete values of electrical conductance. There are many applications where nanowires may become important in electronic, opto-electronic and nano-electromechanical devices, as additives in advanced composites, for metallic interconnects in nanoscale quantum devices, as field-emittors and as leads for biomolecular nanosensors.

After many successful reports on the synthesis, characterization and applications of one-dimensional nanostructures of carbon, various other semiconductor materials and metal oxides have attracted much attention in this new emerging field due to their potential applications in nanocircuits, nano-optoelectronic devices and nanosensors etc. Of the several metal oxides, ZnO has received special prominence due to its unique properties such as direct band gap (Eg=3.37 eV), high exciton binding energy of 60 meV, and partial ionic characteristics resulting in no net dipole moment along preferential orientation (c-axis). ZnO is used in sensors, piezoelectric transducers, field emission sources, transparent conducting oxides (TCO's) in solar cells, biomedical applications and surface acoustic wave (SAW) devices.

Nanocrystalline diamond exhibits high hardness, exceptional thermal conductivity, chemical inertness, biocompatibility, and negative electron affinity. These unique properties make NCD a promising candidate for use as a protective coating with excellent tribological properties; a functional platform for biosensors; and structural material for micro-electro-mechanical systems (MEMS). Particularly, diamond electrodes have attracted considerable interest in recent years due to their superb electrical, thermal and electrochemical properties.

After the successful growth and characterization of the ultrananocrystalline diamond (UNCD) films, interest in the application of ZnO for SAW devices on the UNCD films increased. However, due to the large lattice mismatch between (001) plane of ZnO and (111) plane of the diamond lattice, it is very difficult to grow high-quality ZnO films on the diamond substrates. Integration of dissimilar materials is attractive to fully exploit the potential of the material and realize more applications.

While self-assembled hybrid structures of carbon nanotubes and ultrananocrystalline diamond have been successfully synthesized, the success in the integration of carbon based materials with metal oxides has not been studied. There are no reports on hybrid structures of oxide nanowires and nanocrystalline diamond (NCD) films.

SUMMARY OF INVENTION

The invention includes a method for the synthesis and the integration of ZnO nanowires and nanocrystalline diamond as a novel hybrid material useful in next generation MEMS/NEMS devices. As diamond can provide a highly stable surface for applications in the harsh environments, realization of such hybrid structures may prove to be very fruitful. The inventors synthesized ZnO nanowires on NCD by thermal evaporation technique.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
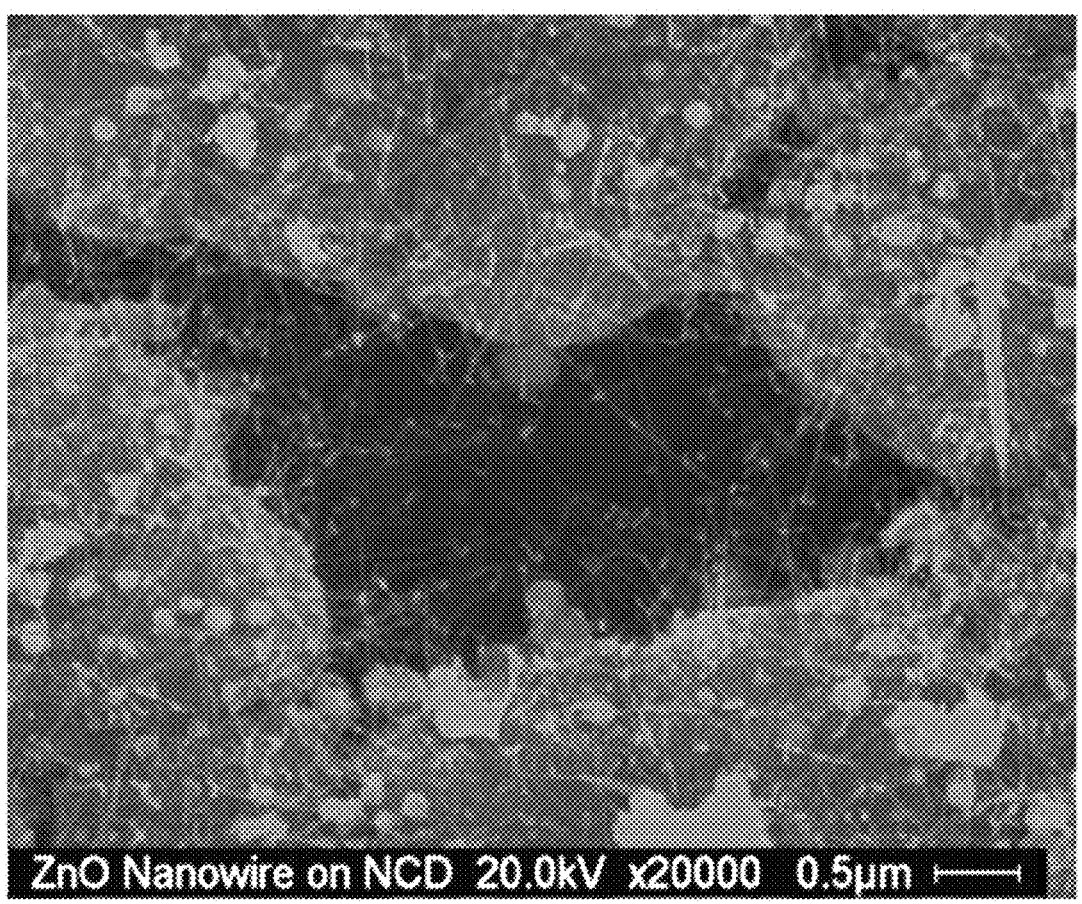
FIG. 1 is a SEM micrograph of ZnO nanowire/NCD composite material.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Substrates which can be used in the inventive method include carbide-forming materials which can be coated with diamond using conventional techniques, such as those described above. Substrates which can be used in the inventive method include carbide-forming materials which can be coated with diamond using conventional techniques, such as those described above. Although the preferred embodiment uses nanocrystalline diamond-coated $SiO_2$, substrates can be comprised of similar material, as known in the art. Substrates are preferably substantially homogenous in material but can include hetereostructures in some embodiments. Substrate material underlying the nanocrystalline diamond may be any semiconductor, such as silicon, glass, quartz, plastic, ceramic, metal, polymers, TiO, ZnO, ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, GaN, GaP, GaAs, GaSb, InN, InP, InAs, InSb, PbS, PbSe, PbTe, AlS, AlP, AlSb, SiO, $SiO_2$, silicon carbide, silicon nitride, polyacrylonitrile (PAN), polyetherketone, polyimide, an aromatic polymer, and an aliphatic polymer. Substrates are preferably substantially homogenous in material but can include hetereostructures in some embodiments.

The term "nanowire" refers to a nanostructure typically characterized by at least one physical dimension less than about 1000 nm, 500 nm, 250 nm, 150 nm, 100 nm, 50 nm, 25 nm, 10 nm or 5 nm. In a preferred embodiment, the region or characteristic dimension is along the smallest axis of the structure. Illustrative nanostructures include nanofilaments, nanofibers and nanotubes. The nanowires of the present invention can be substantially homogeneous in material properties, or can be heterogeneous. The nanowires can be fabricated from any convenient material and may be substantially crystalline, including monocrystalline and polycrystalline. A nanowire may be straight, curved, or bent, over the entire length of its long axis or a portion thereof.

A large number of materials may be used to form nanowires of the present invention, including compounds containing semiconductive or conductive material, such as Si, Ge, Se, Te, B, silicon, glass, quartz, plastic, ceramic, metal, polymers, TiO, ZnO, ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, GaN, GaP, GaAs, GaSb, InN, InP, InAs, InSb, PbS, PbSe, PbTe, AlS, AlP, AlSb, SiO, $SiO_2$, silicon carbide, silicon nitride, polyacrylonitrile (PAN), polyetherketone, polyimide, an aromatic polymer, and an aliphatic polymer, and combinations thereof.

The formation of the nanowire can be accomplished by any manner useful in the deposition of metal oxides nanostructures. Examples include but are not limited to Chemical Vapor Deposition (CVD), Filament Assisted Chemical Vapor Deposition (FACVD), Plasma Enhanced Chemical Vapor Deposition, and Microwave Plasma Enhanced Chemical Vapor Deposition (MPECVD). In a preferred embodiment, the nanowires are synthesized using a Vapor-Liquid-Solid (VLS) mechanism, such as that described in Majumdar et al. (U.S. Pat. No. 6,996,147) and in *General Synthesis of Compound Semiconductor Nanowires*, Xiangfeng Duan and Charles M. Lieber, Adv. Matter. 2000, Vol. 12, No. 4; which are incorporated herein by reference.

It should be noted that the invention is not limited to nanowires produced using the VLS mechanism. The VLS mechanism, however, provides advantages in the production of one-dimensional nanostructures including the ability to control the diameter and monodispersity of the nanowire through the use of catalyst (substrate) particles of well-defined sizes; the ability to grow the nanowires on a solid support and in a patterned array by manipulating the catalyst particles; the ability to generate nanowires with well-controlled length and well-defined variation in the longitudinal composition; and, the ability to process semi-conductors using a solid phase protocol.

Example 1

A methanol/nanocrystalline diamond slurry was made by mixing 5 mg nanocrystalline diamond powder (about 4-5 nm size) with 20 ml of methanol. A silicon underlay substrate was prepared by washing a Si underlay substrate with methanol. The Si underlay substrate was then added to a beaker containing the methanol/nanocrystalline diamond slurry. The methanol/nanocrystalline diamond slurry and Si underlay substrate was subjected to an ultrasonic vibration bath for 15 minutes to make a ultrasonic seeding of nano diamond onto the Si substrate, and the Si piece was removed, rinsed clean methanol, and dried using compressed nitrogen.

The nanocrystalline diamond film was then grown using microwave plasma enhanced chemical vapor deposition (CVD). The seeded Si specimen was placed into a CVD chamber and the chamber evacuated to less than 1 mtorr. Hydrogen was added at 40 sccm flow rate into the CVD chamber, and the microwave powered to 400w to ignite the plasma. $H_2/CH_4/Ar$ was added to the chamber at a ratio of 1:1:98. The pressure was adjusted to 120 Torr, and the temperature raised to above 750° C., resulting in a nanocrystalline diamond film growth rate of about 0.25~0.3 µm/hr. The nanocrystalline diamond was grown for 4 hrs to achieve a 1 µm thick diamond film.

Example 2

ZnO nanowires were grown on the nanocrystalline diamond/silicon substrate. The nanocrystalline diamond/silicon substrate was prepared for nanowire growth. A gold catalyst layer was added to the nanocrystalline diamond/silicon substrate. Next, a piece of the nanocrystalline diamond/silicon substrate with 5 nm thick gold catalyst film was placed into a beaker with methanol. The nanocrystalline diamond/silicon substrate/gold catalyst film was subjected to ultrasonic vibration bath for about 15 minutes to ultrasonically clean the substrate. After completing the cleaning, the nanocrystalline diamond/silicon substrate/gold catalyst film was removed from the beaker, rinsed clean with methanol, and dried by compressed nitrogen. The substrate was then placed into a quartz combustion boat and set into thermal furnace.

Example 3

ZnO nanowires were grown on the nanocrystalline diamond/silicon substrate/gold catalyst film. 600 mg ZnO powder (99.999%, Sigma Aldrich, ~50-70 nm grain size) and 600 mg graphite powder (99.99%, Sigma Aldrich ~70 nm) were separately measured out and the two powders mixed uniformly. The ZnO/graphite powder was placed into quartz combustion boat, separate from the substrate, and inserted into the thermal furnace.

Figure 5:
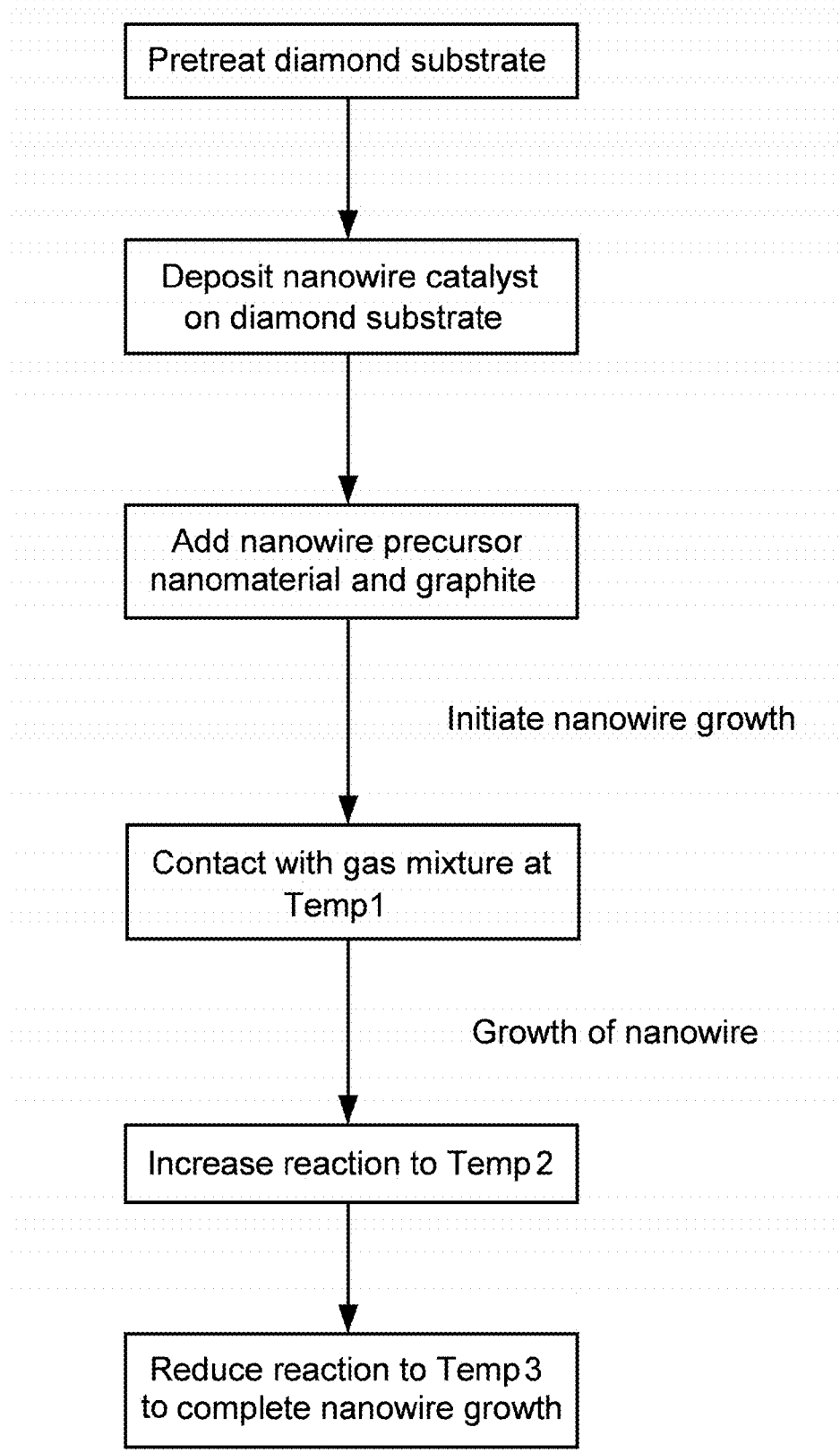
FIG. 5 is a diagram of the method used in the present invention.

ZnO nanowires were grown on nanocrystalline diamond (NCD) films by Vapor-Liquid-Solid (VLS) process. After the substrate and nanowire precursor powder, containing the ZnO/graphite mix, was placed into the thermal furnace, the furnace was evacuated, and 500 sccm of argon was passed through the reactor. The furnace was then activated, and the temperature raised to 1000~1100° C. The furnace was kept at the expected temperature for about 5 to about 10 minutes. The thermal furnace was then cooled to room temperature. One embodiment of growing the nanowires is shown in FIG. 5.

In the VLS growth technique, Zn vapors dissolve into Au catalyst and form an alloy droplet. After saturation, Zn precipitates out from the droplet and gets oxidized as ZnO nanowires. The microstructural properties and the surface morphology of the as-synthesized products were characterized by X-ray diffraction with Cu-K a radiation (Philips X'pert Pro diffractometer) and field emission scanning electron microscopy (FE-SEM, Hitachi S-800) at an accelerating voltage of 5 kV and a beam current of 10 µA.

Figure 2A:
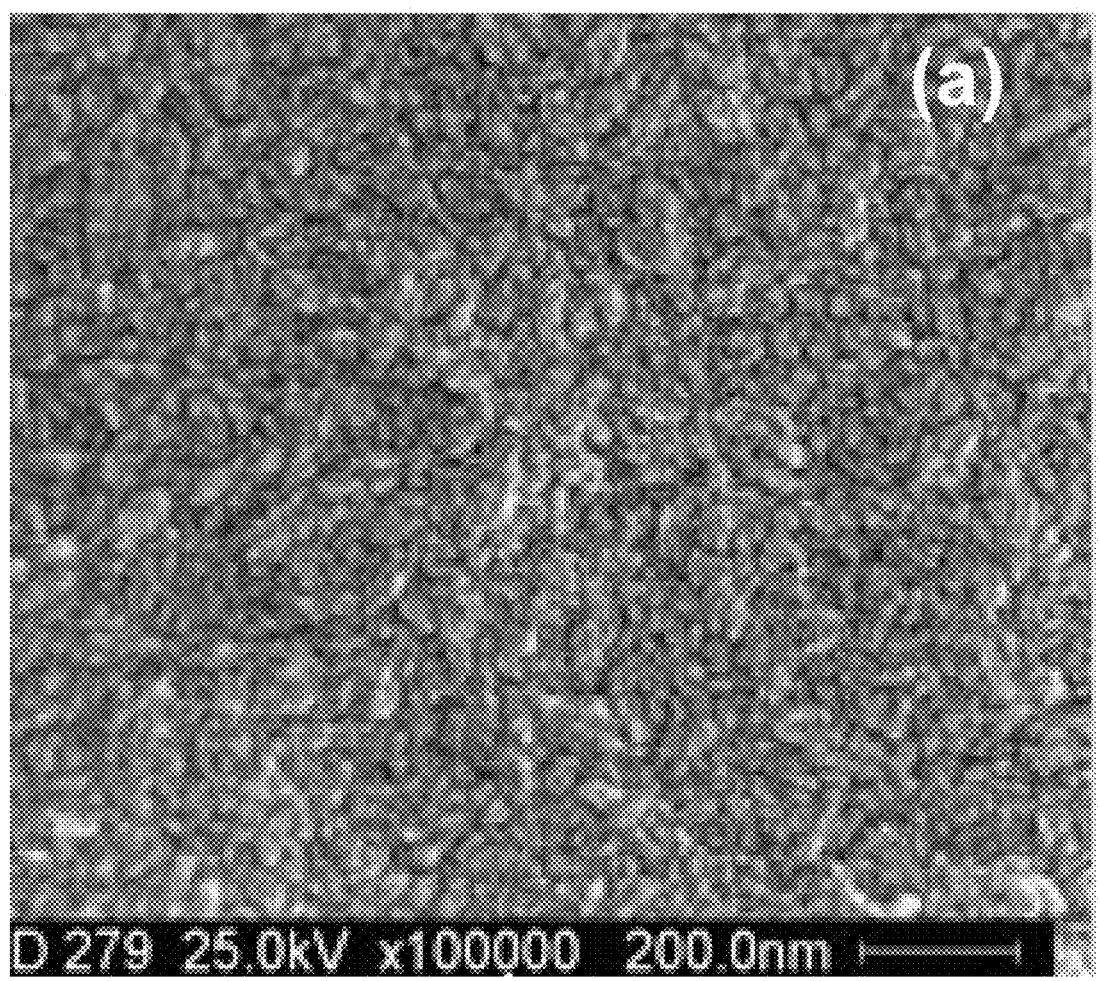
FIG. 2(a) is a scanning electron microscopy (SEM) image of pure NCD film before the growth of ZnO nanowires.
Figure 2B:
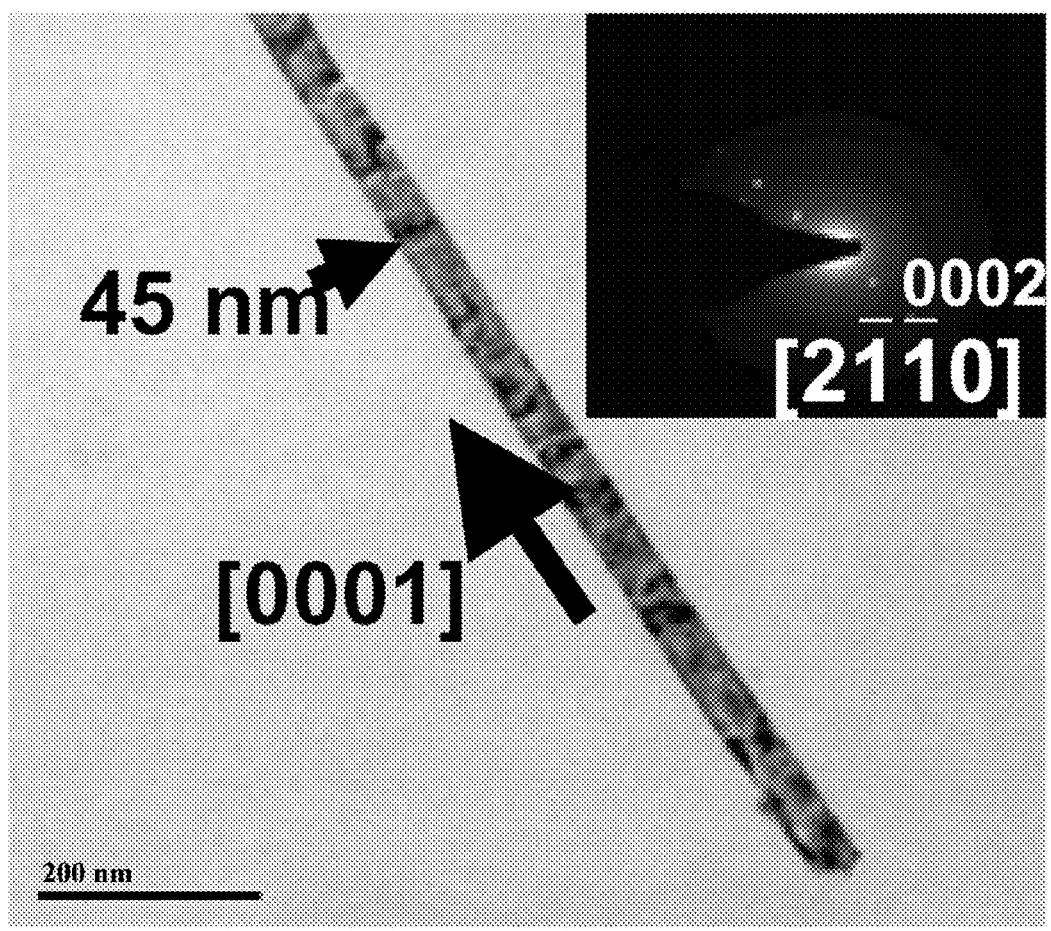
FIG. 2(b) is a segment of an insulated nanowire.

FIG. 1 shows the SEM micrograph of ZnO nanowire/NCD composite material. It can be observed that very fine nanowires of ZnO are connecting the NCD super grains. The scanning electron microscopy (SEM) images of pure NCD film before the growth of ZnO nanowires can be seen in FIG. 2(a). It can be observed that very fine grains (~15 nm to 30 nm) of nanocrystalline diamond are closely packed. FIG. 2(b) shows a segment of an insolated nanowire. It is evident that the diameter is in the range of 20-40 nm and lengths up to several microns. There are alternate dark and bright regions through out the wire and this color contrast is due to the strains experienced by the local regions of the nanowires which reveal that ZnO nanowires are in homogenously strained.

Figure 2C:
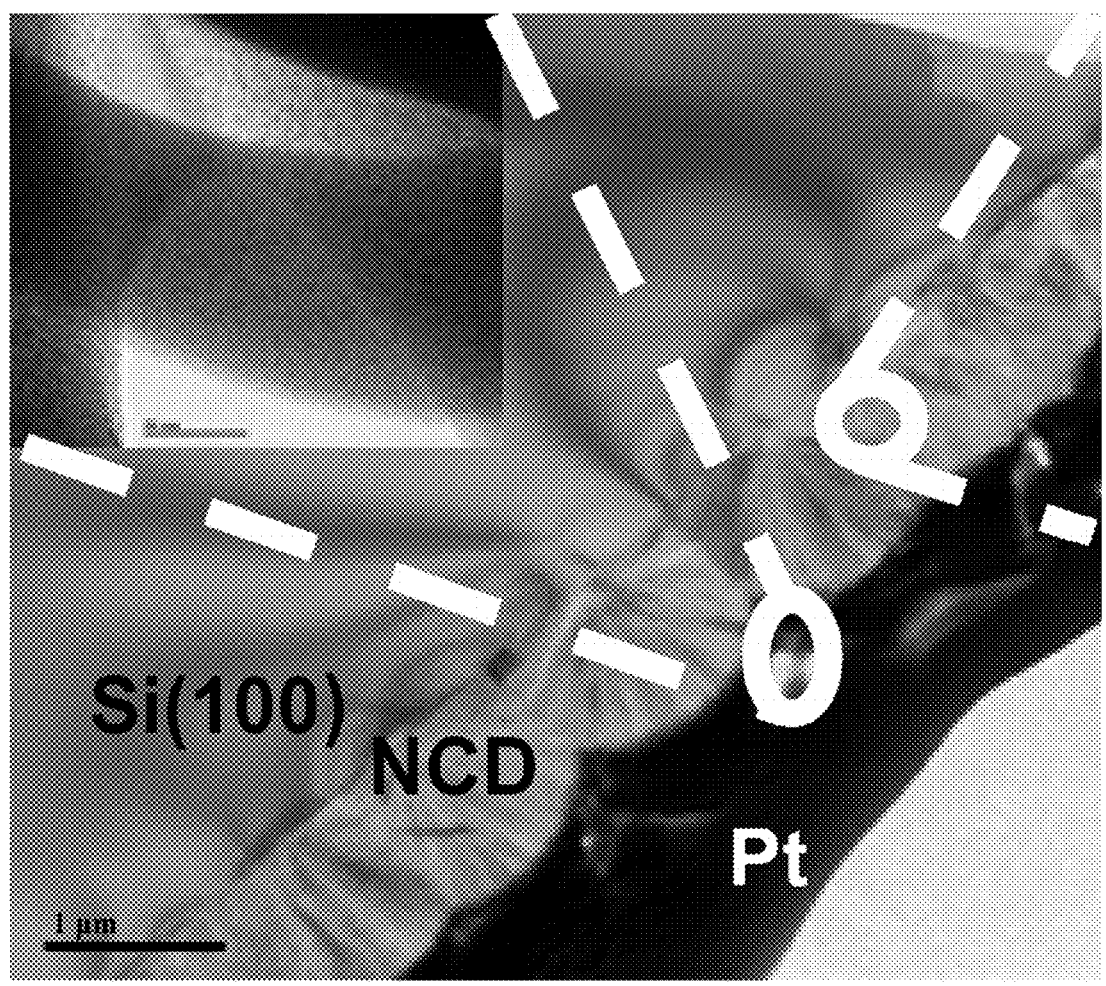
FIG. 2(c) is a typical TEM image of ZnO nanowire/NCD hybrid prepared by focused ion-beam (FIB).
Figure 2D:
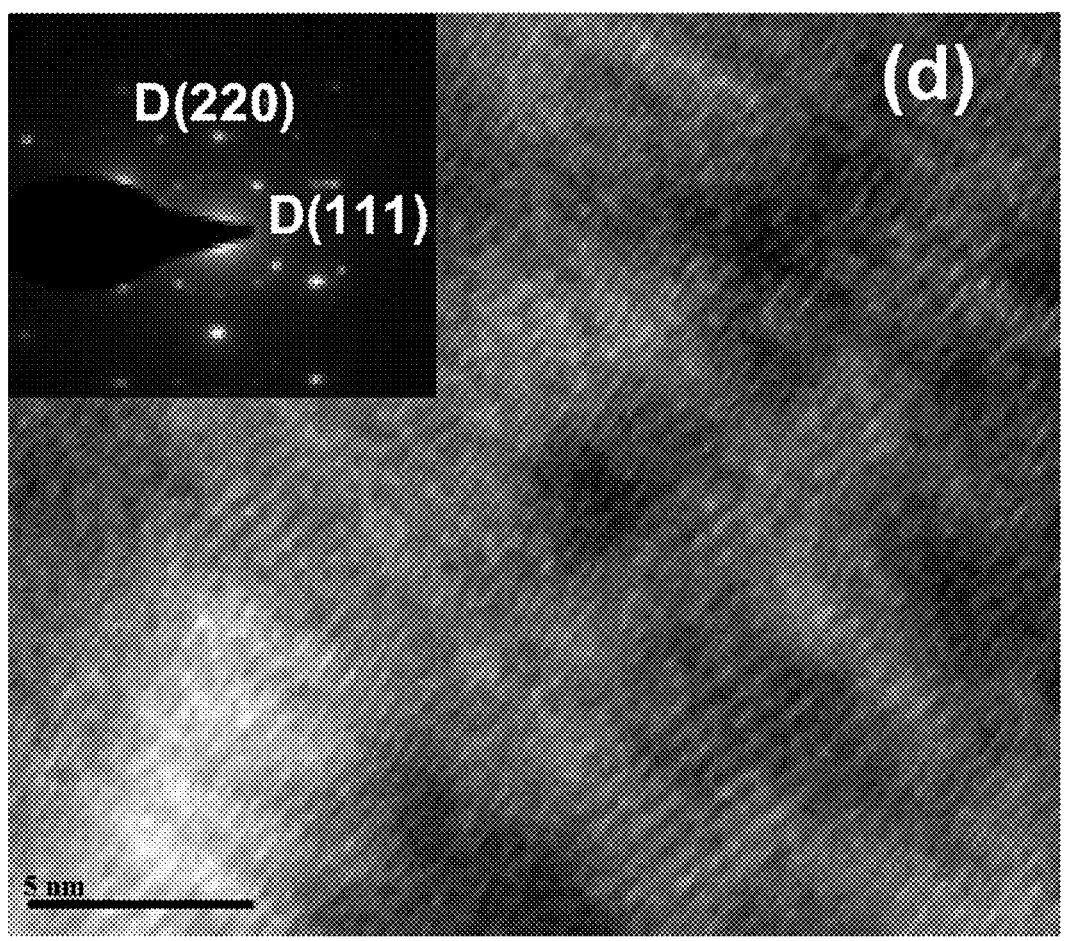
FIG. 2(d) is a TEM micrograph and electron diffraction pattern (inset) of the nanocrystalline

The TEM samples were prepared by Focused Ion Beam (FIB) using a Ga+ ion beam (FEI Strata DB-235 Dual Beam Focused Ion Beam System). High-resolution transmission electron microscopy (FEI Tecnai F30, HR-TEM) was performed in a 300 kV system. Chemical composition analysis was carried out by EDX coupled with the HR-TEM system. FIG. 2(c) shows a typical TEM image of ZnO nanowire/NCD hybrid prepared by focused ion-beam (FIB). The inset shows a high resolution TEM image of a ZnO nanowire embedded inside the grains of nanocrystalline diamond. FIG. 2(d) shows the TEM micrograph and electron diffraction pattern (inset) of the nanocrystalline diamond thin film. The planes D (111) and D (220) are characteristic of NCD. The letter "D" denotes electron diffraction lines of diamond. The grain size distribution of the film was in the order of 15-30 nm.

Figure 3A:
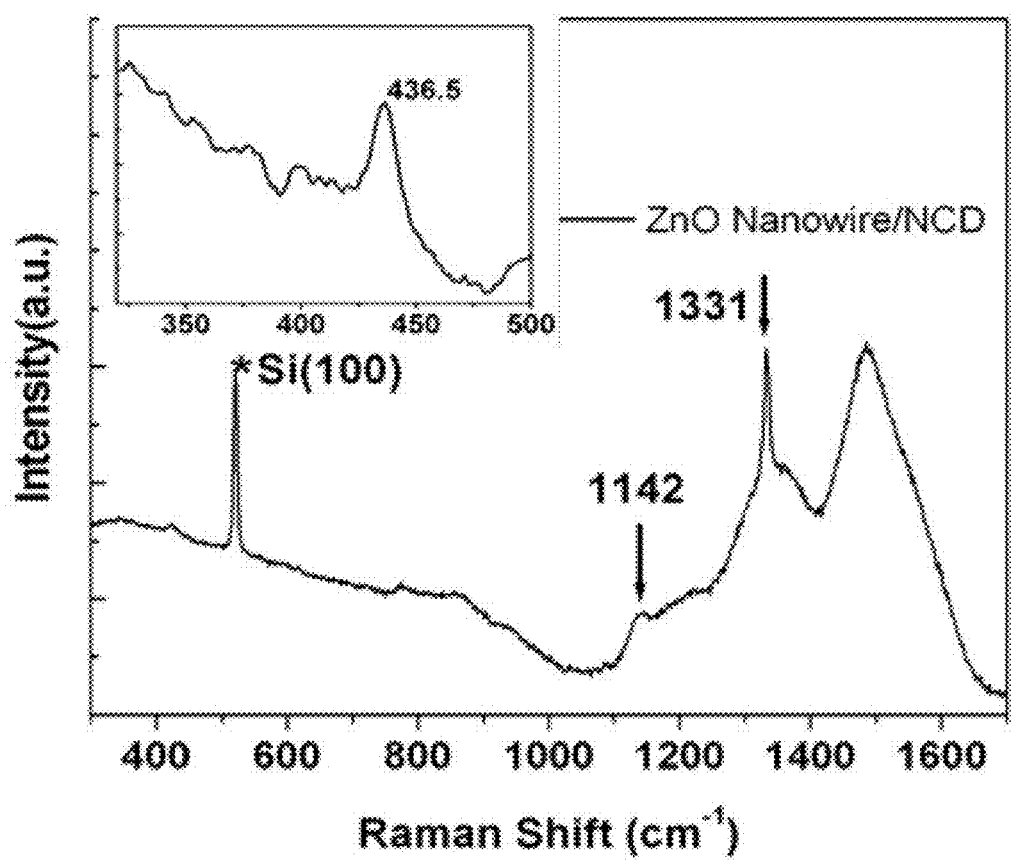
FIG. 3(a) shows the micro-Raman spectrum of the as grown ZnO nanowire/NCD hybrid measured at room temperature in the backscattering configuration.

Raman spectra was performed at room temperature by a Renishaw 1000 Raman spectroscope, with a Ar laser at a wavelength of 514.5 nm, a laser spot size of 1 µm, power density of 25 mW/cm$^2$. FIG. 3(a) shows the micro-Raman spectrum of the as grown ZnO nanowire/NCD hybrid measured at room temperature in the backscattering configuration. Zone centered optical phonons of ZnO were predicted by group theory to have symmetries A1+2B1+2E2+E1. Only A1, E1 and E2 vibration modes are Raman active. The dominant peaks at ~1140 cm$^{-1}$ and 1500 cm$^{-1}$ are speculated to be due to the carbon-hydrogen bonds in the grain boundaries. The peak at 1331 cm$^{-1}$ was attributed to the D-band (disordered) of nanocrystalline diamond. The low frequency Raman measurement is shown in the inset, with a peak at 436.5 cm$^{-1}$ due to E2 transverse optical mode of ZnO nanowires. It has been already reported that for bulk ZnO, the feature is obtained at 437.6 cm$^{-1}$.

Figure 3B:
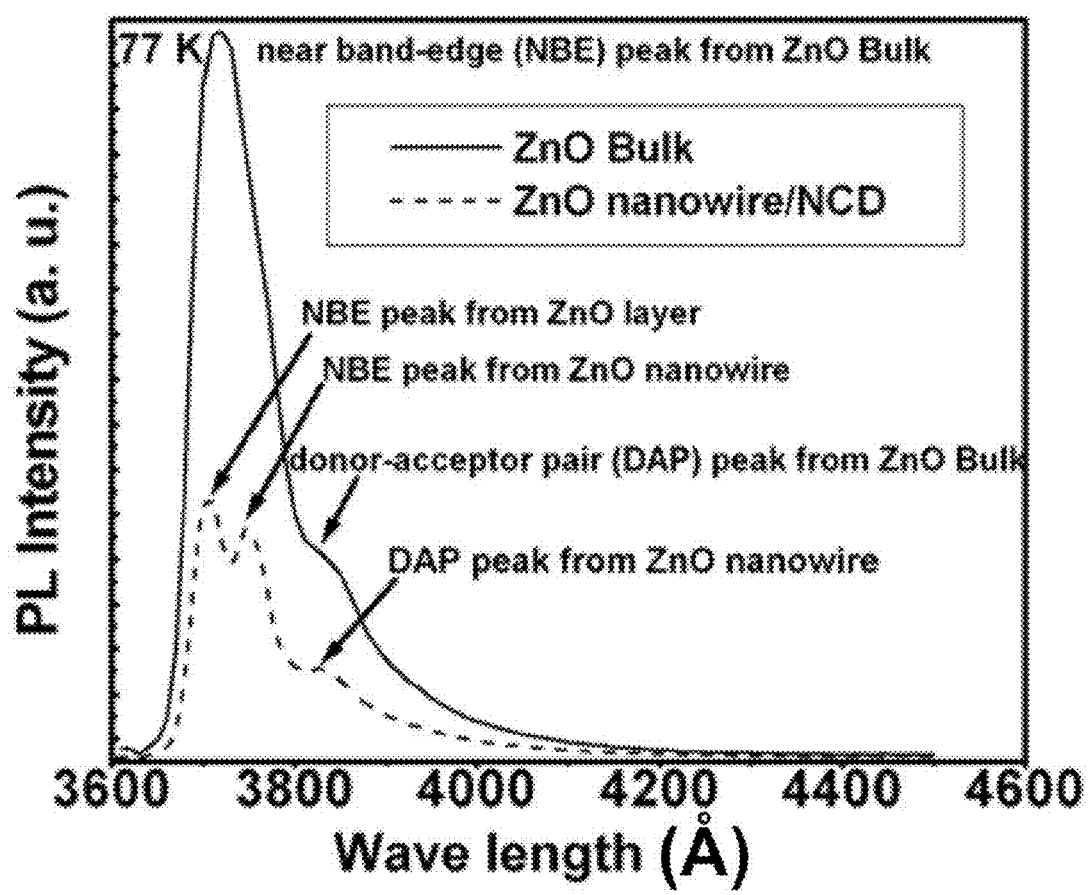
FIG. 3(b) shows the PL spectra of the ZnO nanowires taken at 77 K; for comparison, the PL spectrum of ZnO bulk is also included.
Figure 4A:
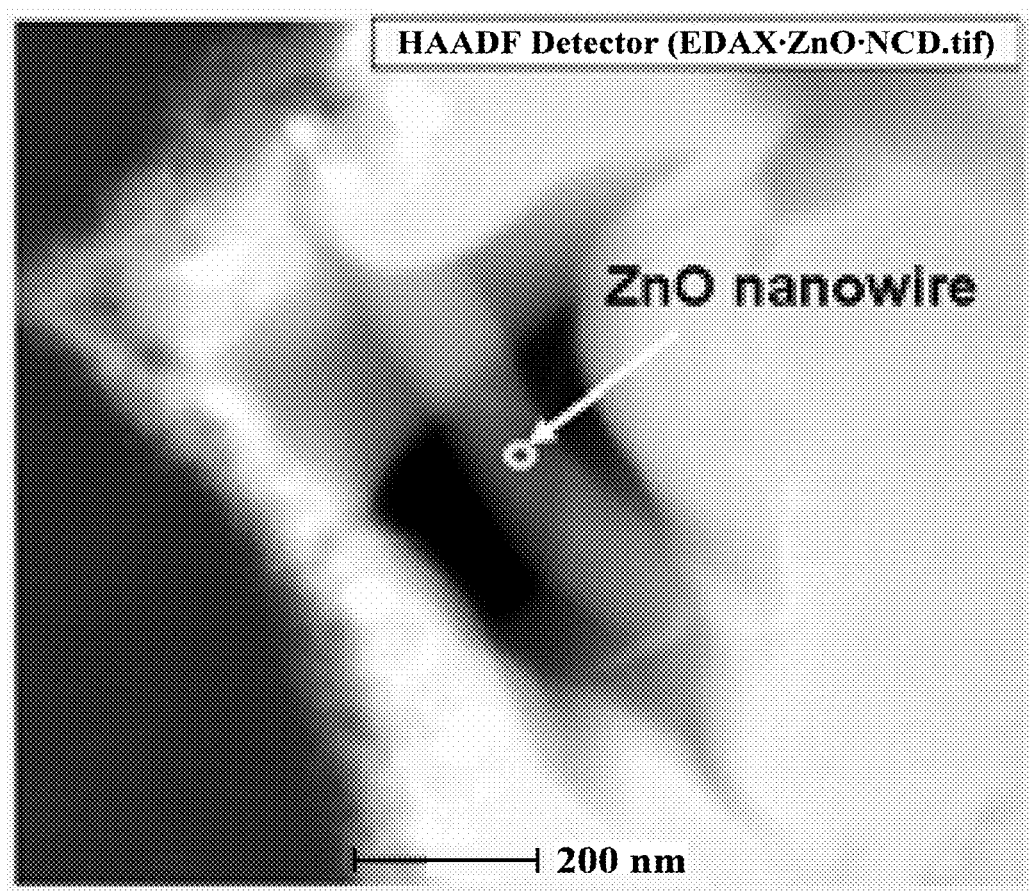
FIG. 4(a) shows a segment of ZnO nanowire is located in the NCD supergrains.
Figure 4B:
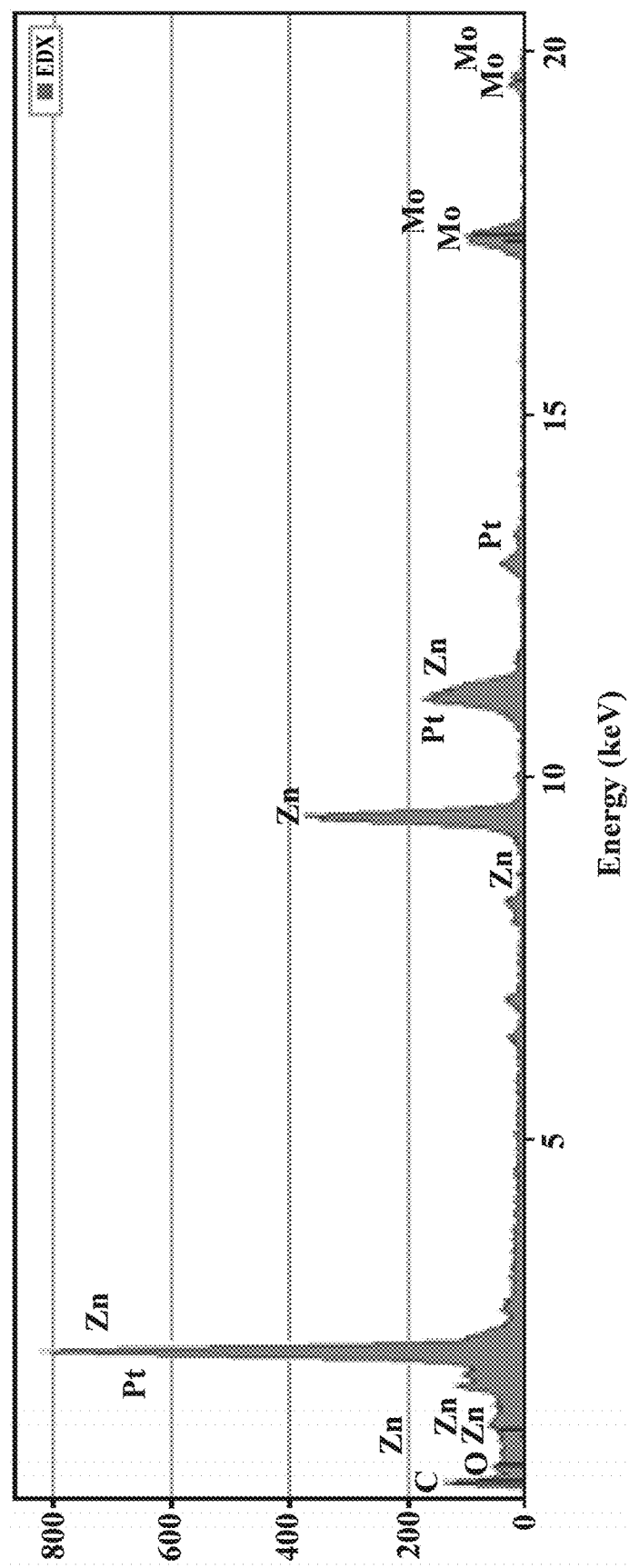
FIG. 4(b) shows a representative energy dispersive X-ray (EDX) spectrum was performed on that location indicate the existence of Zn, O, Pt and Mo.

The optical properties have been studied by conducting photoluminescence (PL) studies at 77 K with a 325-nm line from a He—Cd laser using a single grating spectrometer (SPEX, 1000M). The broadening in the line and shift in the frequency to the lower number is due to the phonon confinement which occurs when the bulk material is scaled down to nanometer dimensions. FIG. 3(b) shows the PL spectra of the ZnO nanowires taken at 77 K; for comparison, the PL spectrum of ZnO bulk is also included. In low temperature PL spectra, the near band-edge (NBE) emission peaks are at 375 nm for nanowires and at 370 nm for the ZnO bulk. These NBE emission peaks are responsible for the recombination of free excitons. We suggest that the peak position at 382 nm corresponds to the donor-acceptor pair (DAP) of the nanowires. In general, the deep-level emission bands are generally related to defects and explained by the radial recombination of a photo-generated hole with an electron in a singly ionized oxygen vacancy. ZnO nanowire/NCD grown by CVD method did not detect such type of peak. It means that ZnO nanowires were defect free and have a good crystalline quality with low concentration of oxygen vacancies. FIG. 4(a) shows a segment of ZnO nanowire is located in the NCD supergrains. A representative energy dispersive X-ray (EDX) spectrum was performed on that location, shown in FIG. 4(b), indicate the existence of Zn, O, Pt and Mo. The peak corresponding to Pt is due to the contamination during the TEM sample preparation by FIB-milling.

Figure 4C:
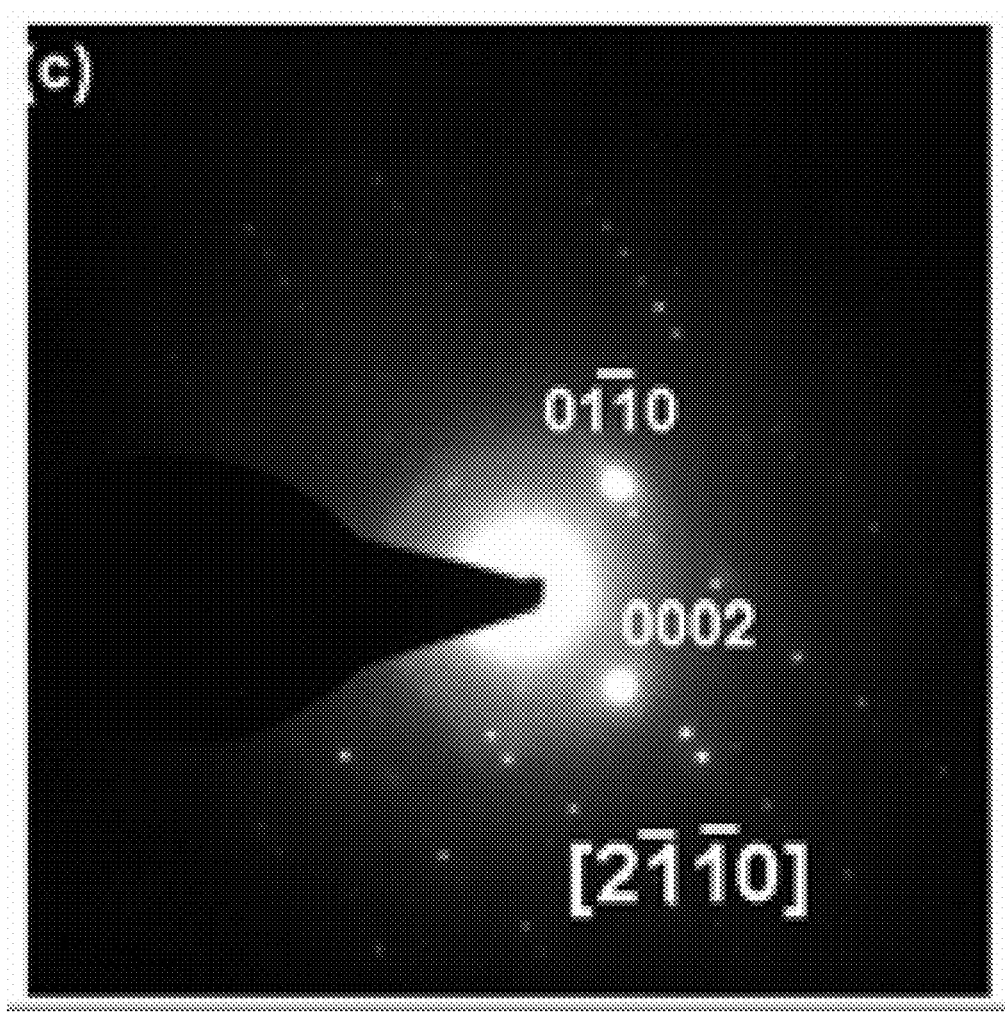
FIG. 4(c) shows the electron diffraction pattern that one dimensional nanowires are single crystal with [0001] preferential growth direction.

The peak related to Mo in the spectrum is due to molybdenum grids. From the EDAX spectrum, it was explicit that the nanowires indeed are ZnO. The selected area electron diffraction (SAED) pattern was performed on ZnO nanowire. During the SAED measurements, the direction of the electron beam was along [2110]. It is clearly shown from the electron diffraction pattern, as seen in FIG. 4(c), that one dimensional nanowires are single crystal with [0001] preferential growth direction.

In summary, the novel hybrid material comprising ZnO nanowire/NCD was synthesized by VLS approach. XRD spectra showed that this material has a preferential orientation along c-axis. SEM images showed that few ZnO nanowires were on the surface and some inside the super grains of NCD having the diameter in the range of 20-100 nm. Electron diffraction pattern showed that nanowires were single crystalline and have [0001] preferential growth direction. From EDAX results, we have confirmed that the nanowires located inside the grains are ZnO. The observation of E2 transverse optical mode in the Raman spectrum further implies that the novel composite material is ZnO nanowire/NCD. Moreover, our PL study suggests that the ZnO nanowires were defect free and have a good crystalline quality with low concentration of oxygen vacancies. We anticipate that this new class of material can be used in microelectronics mechanical systems and piezoelectric applications.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of synthesizing a nanowire with nanocrystalline diamond, comprising the steps of:
   preparing a nanocrystalline diamond film further comprising
      cleaning the nanocrystalline diamond using an ultrasonic vibration bath;
      washing the nanocrystalline diamond with alcohol;

growing a metal oxide nanowire using vapor-liquid-solid process, further comprising:
  applying a catalyst to the nanocrystalline diamond film;
  providing a metal oxide composition;
  heating the nanocrystalline diamond film and the metal oxide composition to a temperature sufficient to induce nanowire growth; and
  permitting the metal oxide to form nanowires in the nanocrystalline diamond film, wherein the nanowires are integrated into the crystals of the nanocrystalline diamond film.

2. The method of claim 1 wherein the nanocrystalline diamond film is grown on a substrate.

3. The method of claim 2 wherein the substrate is Silicon.

4. The method of claim 2 wherein the nanocrystalline diamond film is grown using microwave-plasma-enhanced-chemical-vapor-deposition.

5. The method of claim 2 wherein the nanocrystalline diamond film is grown in an atmosphere comprising about 98% Argon.

6. The method of claim 5 wherein the nanocrystalline diamond film is grown in an atmosphere comprising about 98% Argon, 1% Methane and about 1% Hydrogen.

7. The method of claim 2 wherein the nanocrystalline diamond is grown at a pressure of about 100 Torr for about 3 hours.

8. The method of claim 1 wherein the nanocrystalline diamond is grown at a temperature of about 750° C.

9. The method of claim 1 wherein the catalyst is Gold.

10. The method of claim 1 wherein the catalyst is formed in a layer about 5 nm thick.

11. The method of claim 1 wherein the metal oxide composition is a metal oxide nanopowder.

12. The method of claim 11 wherein the metal oxide comprising the source is ZnO.

13. The method of claim 12 wherein the metal oxide nanopowder is about 50 to 70 nm grain size.

14. The method of claim 1 wherein the nanocrystalline diamond is washed with methanol.

15. The method of claim 1 wherein the ultrasonic vibration bath is undertaken for about 15 minutes.

16. The method of claim 1 wherein the metal oxide composition is a mixture of ZnO powder and graphite powder at a 1:1 weight ratio.

17. The method of claim 1 wherein the metal oxide nanowire is grown using vapor-liquid-solid process in an Argon atmosphere.

* * * * *